US010442496B2

(12) United States Patent
Iwai et al.

(10) Patent No.: US 10,442,496 B2
(45) Date of Patent: Oct. 15, 2019

(54) BICYCLE SPROCKET ASSEMBLY

(71) Applicant: SHIMANO INC., Sakai (JP)

(72) Inventors: Tooru Iwai, Sakai (JP); Tetsu Nonoshita, Sakai (JP); Toyoshi Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 297 days.

(21) Appl. No.: 15/473,517

(22) Filed: Mar. 29, 2017

(65) Prior Publication Data

US 2018/0281898 A1 Oct. 4, 2018

(51) Int. Cl.
| | | |
|---|---|---|
| B62M 9/10 | (2006.01) | |
| F16H 55/12 | (2006.01) | |
| F16H 55/30 | (2006.01) | |
| F16H 55/40 | (2006.01) | |
| F16H 55/48 | (2006.01) | |
| B62M 9/12 | (2006.01) | |

(52) U.S. Cl.
CPC .............. B62M 9/10 (2013.01); B62M 9/105 (2013.01); B62M 9/12 (2013.01); F16H 55/12 (2013.01); F16H 55/30 (2013.01); F16H 55/40 (2013.01); F16H 55/48 (2013.01)

(58) Field of Classification Search
CPC .......... B62M 9/10; B62M 9/105; B62M 9/12; F16H 55/06; F16H 55/12; F16H 55/30; F16H 55/48
USPC ...................................................... 474/160
See application file for complete search history.

(56) References Cited

U.S. PATENT DOCUMENTS

| | | | | |
|---|---|---|---|---|
| 5,194,051 | A * | 3/1993 | Nagano .................... | B62M 9/10 474/160 |
| 5,503,600 | A * | 4/1996 | Berecz ..................... | B62M 9/10 474/160 |
| 6,382,381 | B1 * | 5/2002 | Okajima ............... | B60B 1/0215 192/64 |
| 2008/0188336 | A1 * | 8/2008 | Tokuyama ............... | B62M 9/10 474/160 |
| 2009/0098966 | A1 * | 4/2009 | Kamada ................... | B62M 9/10 474/160 |
| 2014/0335986 | A1 * | 11/2014 | Iwai ....................... | B62M 9/105 474/155 |
| 2015/0210353 | A1 * | 7/2015 | Tokuyama ............... | B62M 9/12 474/160 |
| 2015/0360749 | A1 | 12/2015 | Iwai et al. | |
| 2016/0121965 | A1 * | 5/2016 | Tsai ........................ | B62M 9/10 264/263 |

(Continued)

*Primary Examiner* — William E Dondero
*Assistant Examiner* — Raveen J Dias
(74) *Attorney, Agent, or Firm* — Mori & Ward, LLP

(57) ABSTRACT

A bicycle sprocket assembly comprises a sprocket support member. The sprocket support member comprises a central cylindrical portion and a plurality of sprocket support portions. The plurality of sprocket support portions extends radially outwardly from the central cylindrical portion with respect to a rotational center axis of the bicycle sprocket assembly. At least one sprocket support portion of the plurality of sprocket support portions comprises at least one radially extending surface, at least one axially extending surface, and an interior cavity. The at least one radially extending surface extends radially relative to the rotational center axis to support at least one of the at least one sprocket. The at least one axially extending surface extends in an axial direction parallel to the rotational center axis.

29 Claims, 16 Drawing Sheets

(56) References Cited

U.S. PATENT DOCUMENTS

2016/0347410 A1    12/2016  Watarai et al.
2017/0343047 A1*  11/2017  Chen ........................ B62M 1/36

* cited by examiner

BICYCLE SPROCKET ASSEMBLY

BACKGROUND OF THE INVENTION

Field of the Invention

The present invention relates to a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket assembly comprises a sprocket support member configured to support at least one sprocket that is a separate member from the sprocket support member. The sprocket support member comprises a central cylindrical portion and a plurality of sprocket support portions. The central cylindrical portion comprises a hub engagement profile to engage with a bicycle hub assembly. The plurality of sprocket support portions extends radially outwardly from the central cylindrical portion with respect to a rotational center axis of the bicycle sprocket assembly. At least two sprocket support portions of the plurality of sprocket support portions are spaced apart from each other in a circumferential direction about the rotational center axis. At least one sprocket support portion of the plurality of sprocket support portions comprises at least one radially extending surface, at least one axially extending surface, and an interior cavity. The at least one radially extending surface extends radially relative to the rotational center axis to support at least one of the at least one sprocket. The at least one axially extending surface extends in an axial direction parallel to the rotational center axis.

With the bicycle sprocket assembly according to the first aspect, it is possible to save weight of the sprocket support member with maintaining or increasing strength of the sprocket support member.

In accordance with a second aspect of the present invention, the bicycle sprocket assembly according to the first aspect is configured so that the interior cavity is provided on a reverse side of the at least one radially extending surface and the at least one axially extending surface in the axial direction.

With the bicycle sprocket assembly according to the second aspect, it is possible to utilize an area provided on the reverse side of the at least one radially extending surface and the at least one axially extending surface for the interior cavity.

In accordance with a third aspect of the present invention, the bicycle sprocket assembly according to the first or second aspect is configured so that each sprocket support portion of the plurality of sprocket support portions comprises the at least one radially extending surface, the at least one axially extending surface, and the interior cavity. The interior cavity is provided on a reverse side of the at least one radially extending surface and the at least one axially extending surface in the axial direction.

With the bicycle sprocket assembly according to the third aspect, it is possible to utilize an area provided on the reverse side of the at least one radially extending surface and the at least one axially extending surface for the interior cavity.

In accordance with a fourth aspect of the present invention, the bicycle sprocket assembly according to any one of the first to third aspects is configured so that the central cylindrical portion is a separate member from the plurality of sprocket support portions.

With the bicycle sprocket assembly according to the fourth aspect, it is possible to enlarge a range of choice of materials of the central cylindrical portion and the at least two sprocket support portions.

In accordance with a fifth aspect of the present invention, the bicycle sprocket assembly according to any one of the first to fourth aspects is configured so that the at least one radially extending surface includes a plurality of radially extending surfaces extending radially relative to the rotational center axis. The at least one axially extending surface includes a plurality of axially extending surfaces extending in the axial direction.

With the bicycle sprocket assembly according to the fifth aspect, it is possible to firmly support the at least one sprocket using the radially extending surfaces and the axially extending surfaces.

In accordance with a sixth aspect of the present invention, the bicycle sprocket assembly according to the fifth aspect is configured so that the plurality of radially extending surfaces and the plurality of axially extending surfaces provide a stepped shape.

With the bicycle sprocket assembly according to the sixth aspect, it is possible to it is possible to more firmly support the at least one sprocket using the at least two radially extending surfaces and the at least two axially extending surfaces.

In accordance with a seventh aspect of the present invention, the bicycle sprocket assembly according to any one of the first to sixth aspects further comprises the at least one sprocket attached to the plurality of sprocket support portions.

With the bicycle sprocket assembly according to the seventh aspect, it is possible to firmly support the at least one sprocket using the at least two sprocket support portions.

In accordance with an eighth aspect of the present invention, the bicycle sprocket assembly according to the seventh aspect is configured so that a sprocket of the at least one sprocket is attached to a radially extending surface of the at least one radially extending surface and an axially extending surface of the at least one axially extending surface.

With the bicycle sprocket assembly according to the eighth aspect, it is possible to more firmly support the at least one sprocket using the at least two sprocket support portions.

In accordance with a ninth aspect of the present invention, the bicycle sprocket assembly according to any one of the first to eighth aspects is configured so that the plurality of sprocket support portions is made of a material different from a material of the at least one sprocket.

With the bicycle sprocket assembly according to the ninth aspect, it is possible to enlarge a range of choice of materials of the plurality of sprocket support portions and the at least one sprocket.

In accordance with a tenth aspect of the present invention, the bicycle sprocket assembly according to any one of the seventh to ninth aspects is configured so that the at least one sprocket includes a plurality of sprockets attached to the plurality of sprocket support portions.

With the bicycle sprocket assembly according to the tenth aspect, it is possible to firmly support the plurality of sprockets using the plurality of sprocket support portions.

In accordance with an eleventh aspect of the present invention, the bicycle sprocket assembly according to the tenth aspect is configured so that the at least one radially extending surface includes a plurality of radially extending surfaces extending radially relative to the rotational center axis. The at least one axially extending surface includes a plurality of axially extending surfaces extending in the axial direction. The plurality of sprockets is attached to the plurality of radially extending surfaces and the plurality of axially extending surfaces.

With the bicycle sprocket assembly according to the eleventh aspect, it is possible to more firmly support the plurality of sprockets using the plurality of sprocket support portions.

In accordance with a twelfth aspect of the present invention, the bicycle sprocket assembly according to any one of the first to eleventh aspects is configured so that the at least one radially extending surface extends radially outwardly from the at least one axially extending surface.

With the bicycle sprocket assembly according to the twelfth aspect, it is possible to firmly support the at least one sprocket using the at least one radially extending surface and the at least one axially extending surface.

In accordance with a thirteenth aspect of the present invention, the bicycle sprocket assembly according to any one of the first to twelfth aspects is configured so that the at least one sprocket support portion of the plurality of sprocket support portions comprises a cover portion to form the interior cavity.

With the bicycle sprocket assembly according to the thirteenth aspect, it is possible to save weight of the sprocket support member with maintaining or increasing strength of the sprocket support member.

In accordance with a fourteenth aspect of the present invention, the bicycle sprocket assembly according to any one of the first to thirteenth aspects is configured so that the at least one sprocket support portion of the plurality of sprocket support portions includes a sprocket attachment part, a first side wall, a second side wall, and a cover portion. The sprocket attachment part includes the at least one radially extending surface and the at least one axially extending surface. The cover portion is spaced apart from the sprocket attachment part in the axial direction. The first side wall extends between the sprocket attachment part and the cover portion in the axial direction. The second side wall extends between the sprocket attachment part and the cover portion in the axial direction. The sprocket attachment part, the first side wall, the second side wall, and the cover portion provide the interior cavity.

With the bicycle sprocket assembly according to the fourteenth aspect, it is possible to save weight of the sprocket support member with maintaining or increasing strength of the sprocket support member.

In accordance with a fifteenth aspect of the present invention, the bicycle sprocket assembly according to the fourteenth aspect is configured so that the first side wall extends from the cover portion toward the at least one radially extending surface and the at least one axially extending surface in the axial direction. The second side wall extends from the cover portion toward the at least one radially extending surface and the at least one axially extending surface in the axial direction.

With the bicycle sprocket assembly according to the fifteenth aspect, it is possible to save weight of the sprocket support member with maintaining or increasing strength of the sprocket support member.

In accordance with a sixteenth aspect of the present invention, the bicycle sprocket assembly according to the fourteenth or fifteenth aspect is configured so that the sprocket attachment part is made of a first material. The cover portion is made of a second material different from the first material.

With the bicycle sprocket assembly according to the sixteenth aspect, it is possible to enlarge a range of choice of materials of the sprocket attachment part and the cover portion.

In accordance with a seventeenth aspect of the present invention, the bicycle sprocket assembly according to the sixteenth aspect is configured so that the first material includes a non-metallic material. The second material includes a metallic material.

With the bicycle sprocket assembly according to the seventeenth aspect, it is possible to save weight of the sprocket support member with maintaining or increasing strength of the sprocket support member.

In accordance with an eighteenth aspect of the present invention, the bicycle sprocket assembly according to the seventeenth aspect is configured so that the non-metallic material includes a fiber-reinforced plastic.

With the bicycle sprocket assembly according to the eighteenth aspect, it is possible to save weight of the sprocket support member with maintaining or increasing strength of the sprocket support member.

In accordance with a nineteenth aspect of the present invention, the bicycle sprocket assembly according to the seventeenth or eighteenth aspect is configured so that the metallic material includes at least one of aluminum, iron, and titanium.

With the bicycle sprocket assembly according to the nineteenth aspect, it is possible to save weight of the sprocket support member with maintaining or increasing strength of the sprocket support member.

In accordance with a twentieth aspect of the present invention, a bicycle sprocket assembly comprises a plurality of sprockets and a sprocket support member. One sprocket of the plurality of sprockets is a separate member from another sprocket of the plurality of sprockets. The sprocket support member is configured to support at least one sprocket of the plurality of sprockets. The sprocket support member is a separate member from the plurality of sprockets. The sprocket support member comprises a central cylindrical portion and a plurality of sprocket support portions. The central cylindrical portion comprises a hub engagement profile to engage with a bicycle hub assembly. The plurality of sprocket support portions extends radially outwardly from the central cylindrical portion with respect to a rotational center axis of the bicycle sprocket assembly. At least two sprocket support portions of the plurality of sprocket support portions is spaced apart from each other in a circumferential direction about the rotational center axis. At least one sprocket support portion of the plurality of sprocket support portions comprising an interior cavity.

With the bicycle sprocket assembly according to the twentieth aspect, it is possible to save weight of the sprocket support member with maintaining or increasing strength of the sprocket support member.

In accordance with a twenty-first aspect of the present invention, a bicycle sprocket assembly comprises a sprocket support member configured to support at least one sprocket that is a separate member from the sprocket support member. The sprocket support member comprises a central cylindrical portion and a plurality of sprocket support portions extending radially outwardly from the central cylindrical portion with respect to a rotational center axis of the bicycle sprocket assembly. At least two sprocket support portions of the plurality of sprocket support portions is spaced apart from each other in a circumferential direction defined about the rotational center axis. At least one sprocket support portion of the plurality of sprocket support portions comprises a plurality of radially extending surfaces, a plurality of axially extending surfaces, and an interior cavity. The plurality of radially extending surfaces extends radially relative to the rotational center axis to support at least one of the at least one sprocket. The plurality of axially extending surfaces extends in an axial direction parallel to the rotational center axis. The plurality of radially extending surfaces and the plurality of axially extending surfaces provide a stepped shape.

With the bicycle sprocket assembly according to the twenty-first aspect, it is possible to save weight of the sprocket support member with maintaining or increasing strength of the sprocket support member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
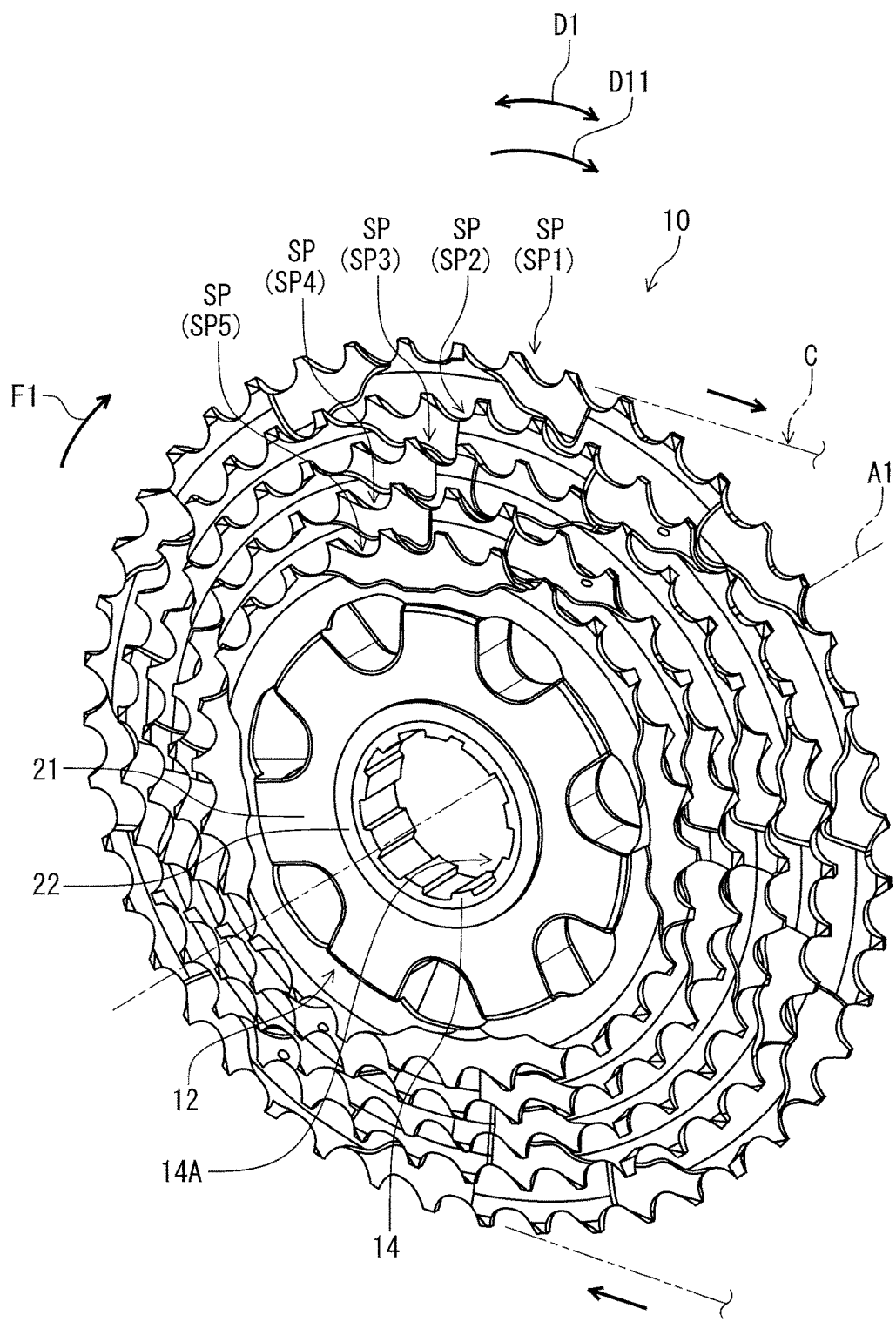
FIG. 1 is a perspective view of a bicycle sprocket assembly in accordance with an embodiment.

The embodiment(s) will now be described with reference to the accompanying drawings, wherein like reference numerals designate corresponding or identical elements throughout the various drawings.

Figure 2:
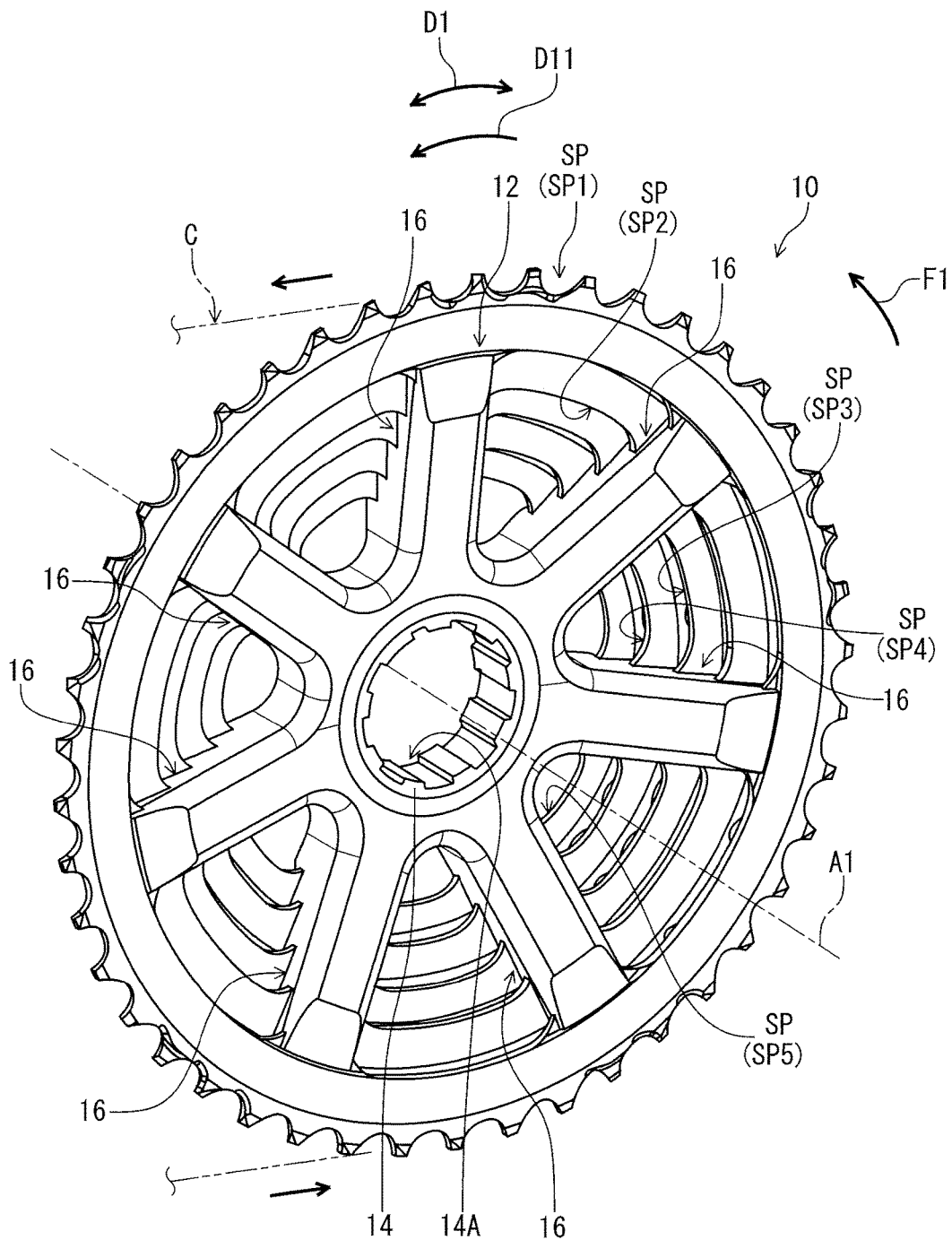
FIG. 2 is another perspective view of the bicycle sprocket assembly illustrated in FIG. 1.

Referring initially to FIGS. 1 and 2, a bicycle sprocket assembly 10 in accordance with an embodiment comprises a sprocket support member 12. The bicycle sprocket assembly 10 further comprises at least one sprocket of a plurality of sprockets SP. The sprocket support member 12 is configured to support the at least one sprocket (the plurality of sprockets) SP. The at least one sprocket SP is a separate member from the sprocket support member 12. The sprocket support member 12 is a separate member from the plurality of sprockets SP.

In this embodiment, as seen in FIG. 1, one sprocket of the plurality of sprockets SP is a separate member from another sprocket of the plurality of sprockets SP. The at least one sprocket SP includes sprockets SP1, SP2, SP3, SP4, and SP5. The sprocket support member 12 is a separate member from the sprockets SP1 to SP5. The sprockets SP1 to SP5 are separate members from each other. However, at least one of the sprockets SP1 to SP5 can be at least partly provided integrally with another of the sprockets SP1 to SP5. A total number of sprockets SP is not limited to this embodiment. In this embodiment, the bicycle sprocket assembly 10 is a rear sprocket assembly. However, structures of the bicycle sprocket assembly 10 can be applied to a front sprocket assembly.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10, should be interpreted relative to the bicycle equipped with the bicycle sprocket assembly 10 as used in an upright riding position on a horizontal surface.

Figure 3:
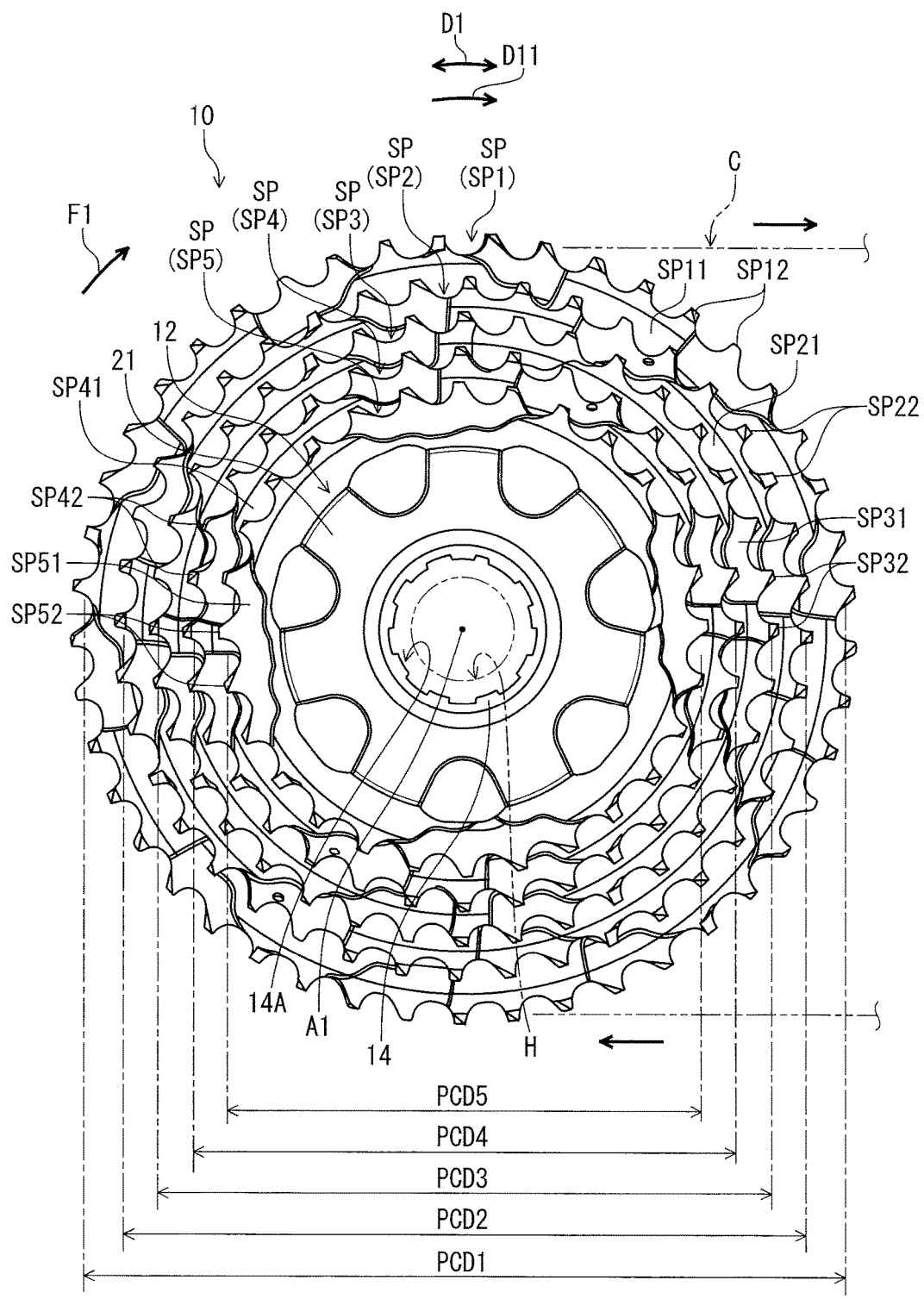
FIG. 3 is a side elevational view of the bicycle sprocket assembly illustrated in FIG. 1.

As seen in FIG. 3, the bicycle sprocket assembly 10 has a rotational center axis A1 and is rotatably supported by a bicycle hub assembly H relative to a bicycle frame (not shown) about the rotational center axis A1. The bicycle sprocket assembly 10 is configured to be engaged with a bicycle chain C to transmit a driving rotational force F1 between the bicycle chain C and the bicycle sprocket assembly 10. The bicycle sprocket assembly 10 is rotated about the rotational center axis A1 in a driving rotational direction D11 during pedaling. The driving rotational direction D11 is defined along a circumferential direction D1 of the bicycle sprocket assembly 10.

Figure 4:
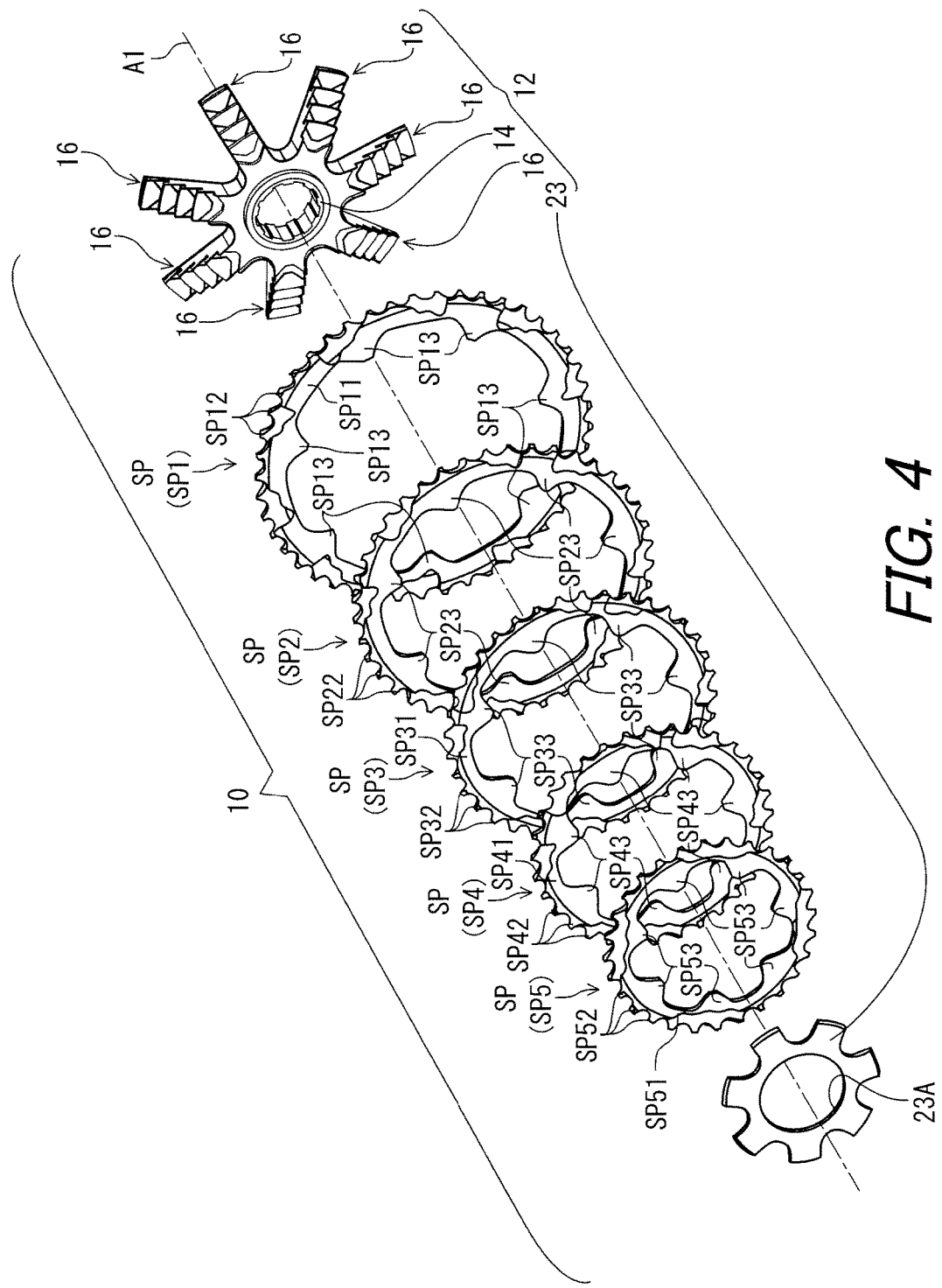
FIG. 4 is an exploded perspective view of the bicycle sprocket assembly illustrated in FIG. 1.

As seen in FIG. 4, the sprocket SP1 includes a sprocket body SP11 and a plurality of sprocket teeth SP12 extending radially outwardly from the sprocket body SP11. The sprocket SP2 includes a sprocket body SP21 and a plurality of sprocket teeth SP22 extending radially outwardly from the sprocket body SP21. The sprocket SP3 includes a sprocket body SP31 and a plurality of sprocket teeth SP32 extending radially outwardly from the sprocket body SP31. The sprocket SP4 includes a sprocket body SP41 and a plurality of sprocket teeth SP42 extending radially outwardly from the sprocket body SP41. The sprocket SP5 includes a sprocket body SP51 and a plurality of sprocket teeth SP52 extending radially outwardly from the sprocket body SP51.

In this embodiment, a total number of the sprocket teeth SP12 is 45. A total number of the sprocket teeth SP22 is 40. A total number of the sprocket teeth SP32 is 36. A total number of the sprocket teeth SP42 is 32. A total number of the sprocket teeth SP52 is 28. However, a total number of the sprocket teeth SP12 is not limited to this embodiment. A total number of the sprocket teeth SP22 is not limited to this embodiment. A total number of the sprocket teeth SP32 is not limited to this embodiment. A total number of the sprocket teeth SP42 is not limited to this embodiment. A total number of the sprocket teeth SP52 is not limited to this embodiment.

The sprocket SP1 has a pitch-circle diameter PCD1. The sprocket SP2 has a pitch-circle diameter PCD2. The sprocket SP3 has a pitch-circle diameter PCD3. The sprocket SP4 has a pitch-circle diameter PCD4. The sprocket SP5 has a pitch-circle diameter PCD5. The pitch-circle diameter PCD1 is the largest among the pitch-circle diameters PCD1 to PCD5. The pitch-circle diameter PCD5 is the smallest among the pitch-circle diameters PCD1 to PCD5. The sprocket SP1 corresponds to low gear. The sprocket SP5 corresponds to top gear. The pitch-circle diameter PCD1 is defined by centers of pins (not shown) of the bicycle chain C engaged with the sprocket SP1. The pitch-circle diameter PCD2 is defined by the centers of the pins (not shown) of the bicycle chain C engaged with the sprocket SP2. The pitch-circle diameter PCD3 is defined by the centers of the pins (not shown) of the bicycle chain C engaged with the sprocket SP3. The pitch-circle diameter PCD4 is defined by the centers of the pins (not shown) of the bicycle chain C engaged with the sprocket SP4. The pitch-circle diameter PCD5 is defined by the centers of the pins (not shown) of the bicycle chain C engaged with the sprocket SP5.

As seen in FIG. 4, the sprocket body SP11 includes projections SP13. The sprocket body SP21 includes projections SP23. The sprocket body SP31 includes projections SP33. The sprocket body SP41 includes projections SP43. The sprocket body SP51 includes projections SP53.

Figure 5:
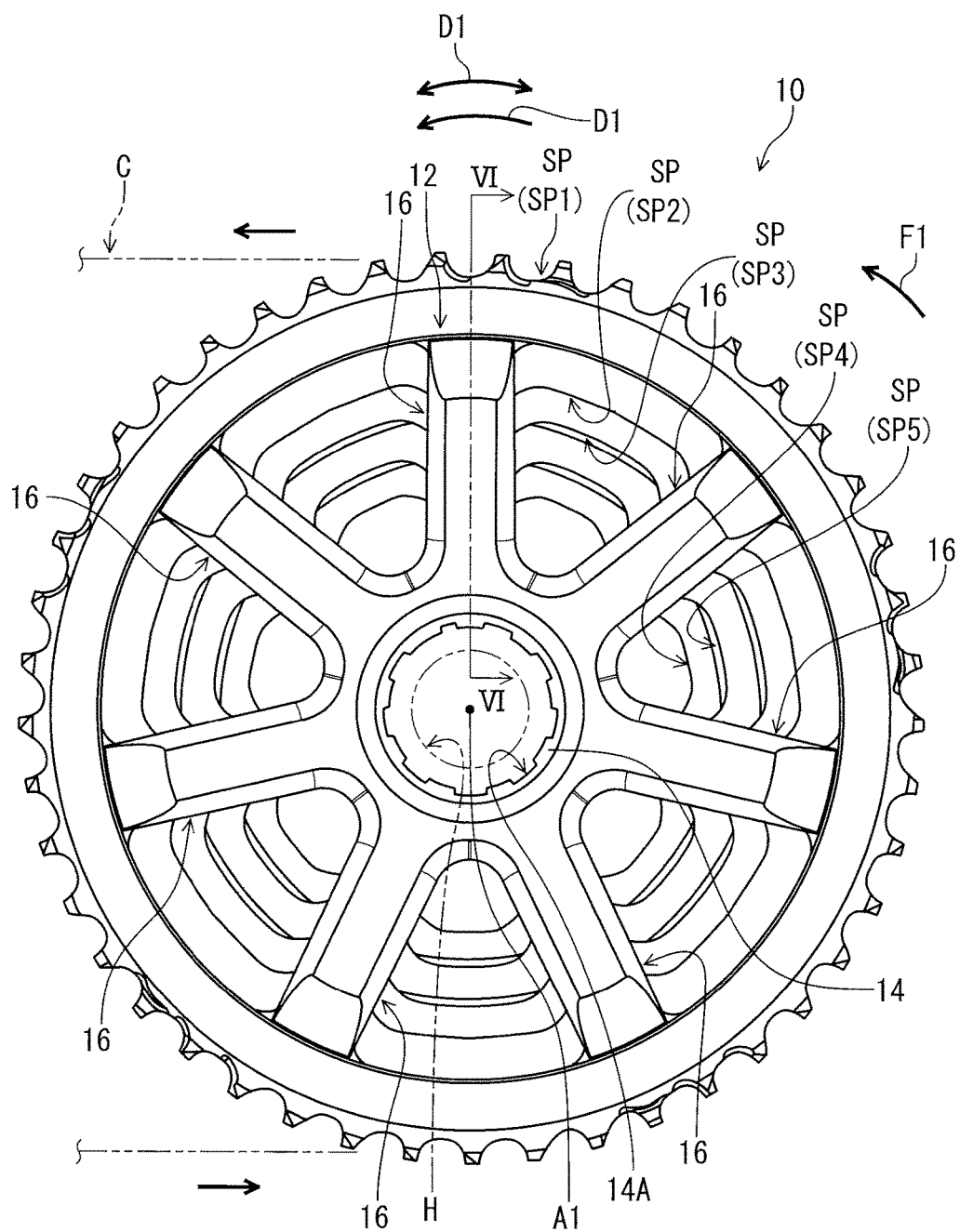
FIG. 5 is another side elevational view of the bicycle sprocket assembly illustrated in FIG. 1.

As seen in FIG. 5, the sprocket support member 12 comprises a central cylindrical portion 14 and a plurality of sprocket support portions 16. The central cylindrical portion 14 comprises a hub engagement profile 14A to engage with the bicycle hub assembly H. The plurality of sprocket support portions 16 extend radially outwardly from the central cylindrical portion 14 with respect to the rotational center axis A1 of the bicycle sprocket assembly 10. At least two sprocket support portions of the plurality of sprocket support portions 16 are spaced apart from each other in the circumferential direction D1 about the rotational center axis A1.

In this embodiment, the sprocket support portions 16 are spaced apart from each other in the circumferential direction D1 about the rotational center axis A1. A total number of the sprocket support portions 16 is not limited to this embodiment. In this embodiment, the central cylindrical portion 14 is a separate member from the plurality of sprocket support portions 16. However, the central cylindrical portion 14 can be integrally provided with at least one of the plurality of sprocket support portions 16 as a one-piece unitary member. For example, the central cylindrical portion 14 is made of a metallic material.

As seen in FIG. 2, the at least one sprocket SP is attached to the plurality of sprocket support portions 16. The plurality of sprockets SP is attached to the plurality of sprocket support portions 16. In this embodiment, each of the sprockets SP1 to SP5 is attached to each of the sprocket support portions 16.

Figure 6:
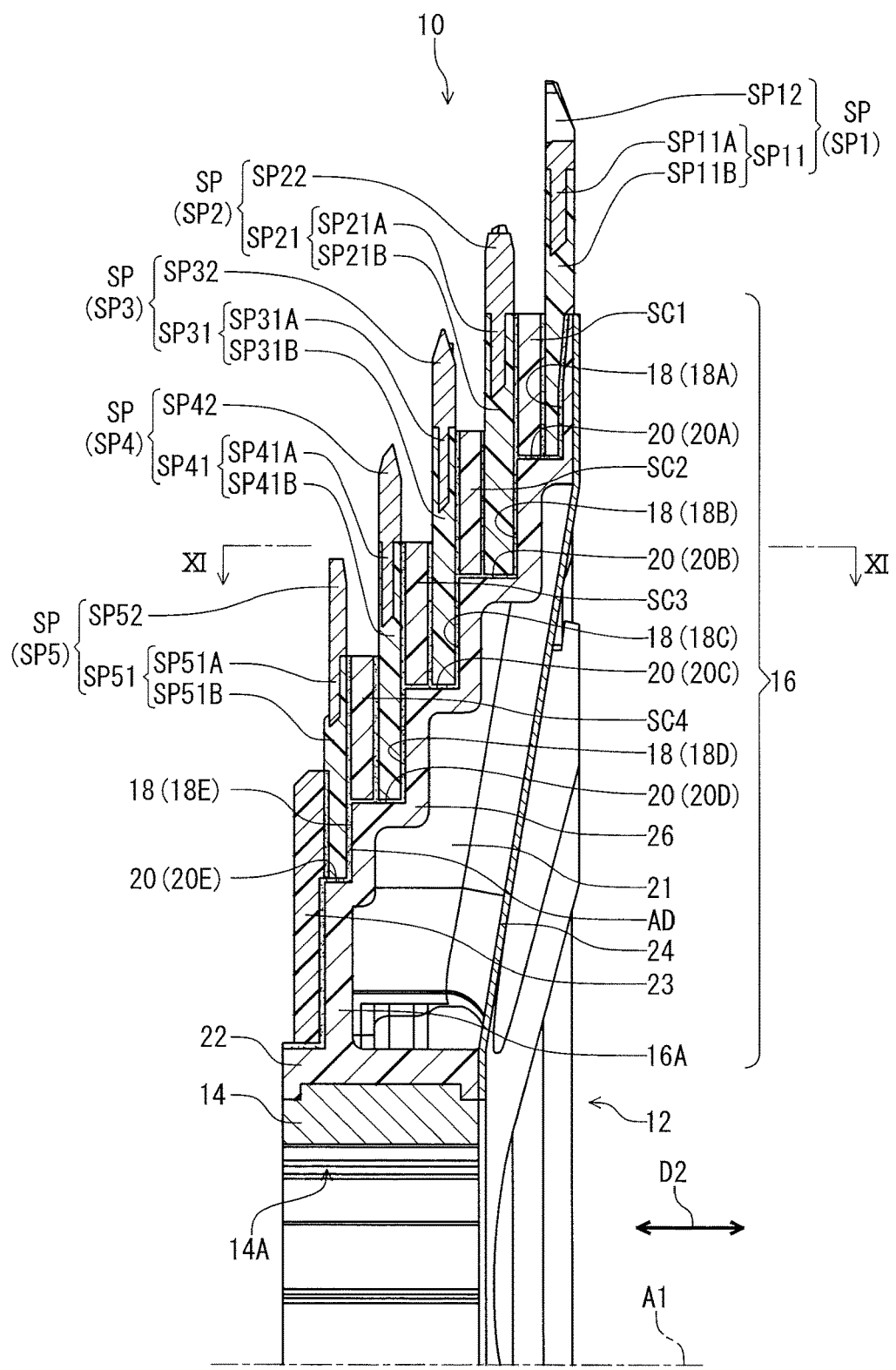
FIG. 6 is a cross-sectional view of the bicycle sprocket assembly taken along line VI-VI of FIG. 5.

FIG. 6 is a cross-sectional view of the sprocket support member 12 taken along one of the sprocket support portions 16. The sprocket support portions 16 have substantially the same structures as each other. Thus, FIG. 6 can be utilized to describe cross-sections of the sprocket support portions 16.

As seen in FIG. 6, at least one sprocket support portion of the plurality of sprocket support portions 16 comprises at least one radially extending surface 18, at least one axially extending surface 20, and an interior cavity 21. The at least one radially extending surface 18 extends radially relative to the rotational center axis A1 to support at least one of the at least one sprocket SP. The at least one axially extending surface 20 extend in an axial direction D2 parallel to the rotational center axis A1. In this embodiment, the at least one radially extending surface 18 include a plurality of radially extending surfaces 18 extending radially relative to the rotational center axis A1. The at least one axially extending surface 20 include a plurality of axially extending surfaces 20 extending in the axial direction D2.

In this embodiment, the at least one radially extending surface 18 includes the radially extending surfaces 18A, 18B, 18C, 18D, and 18E. The at least one axially extending surface 20 includes the axially extending surfaces 20A, 20B, 20C, 20D, and 20E. However, a total number of the at least one radially extending surface 18 is not limited to this embodiment. A total number of the at least one axially extending surface 20 is not limited to this embodiment. The plurality of radially extending surfaces 18A to 18E are offset from each other in the axial direction D2. The plurality of axially extending surfaces 20A to 20E are radially offset from each other.

As seen in FIG. 6, the plurality of radially extending surfaces 18 and the plurality of axially extending surfaces 20 provide a stepped shape. The at least one radially extending surface 18 extends radially outwardly from the at least one axially extending surface 20. In this embodiment, the radially extending surfaces 18A to 18E and the axially extending surfaces 20A to 20E provide the stepped shape. The radially extending surface 18A extends radially outwardly from the axially extending surface 20A. The radially extending surface 18B extends radially outwardly from the axially extending surface 20B to the axially extending surface 20A. The radially extending surface 18C extends radially outwardly from the axially extending surface 20C to the axially extending surface 20B. The radially extending surface 18D extends radially outwardly from the axially extending surface 20D to the axially extending surface 20C. The radially extending surface 18E extends radially outwardly from the axially extending surface 20E to the axially extending surface 20D.

The at least one axially extending surface 20 extends axially from the at least one radially extending surface 18. The axially extending surface 20A extends from the radially extending surface 18A to the radially extending surface 18B in the axial direction D2. The axially extending surface 20B extends from the radially extending surface 18B to the radially extending surface 18C in the axial direction D2. The axially extending surface 20C extends from the radially extending surface 18C to the radially extending surface 18D in the axial direction D2. The axially extending surface 20D extends from the radially extending surface 18D to the radially extending surface 18E in the axial direction D2. The axially extending surface 20E extends from the radially extending surface 18E in the axial direction D2.

As seen in FIG. 6, the plurality of sprockets SP is attached to the plurality of radially extending surfaces 18 and the plurality of axially extending surfaces 20. A sprocket of the at least one sprocket SP is attached to a radially extending surface of the at least one radially extending surface 18 and an axially extending surface of the at least one axially extending surface 20. In this embodiment, the sprocket SP1 is attached to the radially extending surface 18A and the axially extending surface 20A of each of the sprocket support portions 16. The sprocket SP2 is attached to the radially extending surface 18B and the axially extending surface 20B of each of the sprocket support portions 16. The sprocket SP3 is attached to the radially extending surface 18C and the axially extending surface 20C of each of the sprocket support portions 16. The sprocket SP4 is attached to the radially extending surface 18D and the axially extending surface 20D of each of the sprocket support portions 16. The sprocket SP5 is attached to the radially extending surface 18E and the axially extending surface 20E of each of the sprocket support portions 16. However, the sprocket of the at least one sprocket SP can be attached to only a radially extending surface of the at least one radially extending surface 18.

The sprocket body SP11 includes a first part SP11A and a second part SP11B. Each of the first part SP11A and the second part SP11B has an annular shape. The plurality of sprocket teeth SP12 extends radially outwardly from the first part SP11A. The first part SP11A extends radially outwardly from the second part SP11B and is at least partly provided in the second part SP11B. The first part SP11A is integrally provided with the plurality of sprocket teeth SP12. The second part SP11B is a separate member from the first part SP11A and the plurality of sprocket teeth SP12. The first part SP and the plurality of sprocket teeth SP12 are made of a metallic material such as aluminum, iron, or titanium. The second part SP11B is made of a non-metallic material such as a resin material. However, the first part SP11A can be integrally provided with the second part SP11B as a one-piece unitary member.

The sprocket body SP21 includes a first part SP21A and a second part SP21B. The sprocket body SP31 includes a first part SP31A and a second part SP31B. The sprocket body SP41 includes a first part SP41A and a second part SP41B. The sprocket body SP51 includes a first part SP51A and a second part SP51B. The first parts SP21A, SP31A, SP41A, and SP51A have substantially the same structure as that of the first part SP11A. The second parts SP21B, SP31B, SP41B, and SP51B have substantially the same structure as that of the second part SP11B. Thus, they will not be described in detail here for the sake of brevity.

Figure 7:
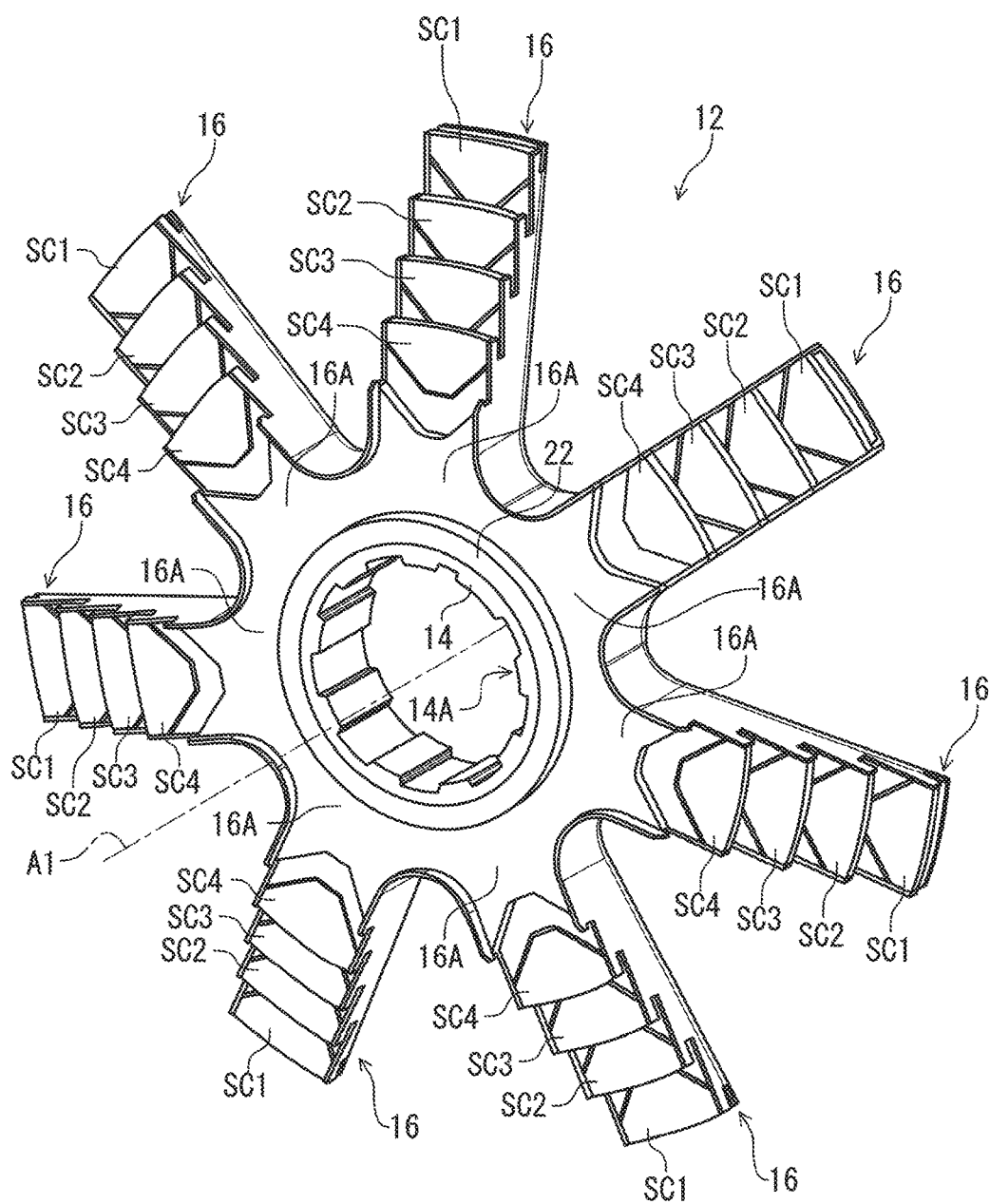
FIG. 7 is a perspective view of a sprocket support member of the bicycle sprocket assembly illustrated in FIG. 1, with a support part omitted.

Each of the sprocket support portions 16 includes at least one spacer SC provided between adjacent two sprockets of the plurality of sprockets SP in the axial direction D2. In this embodiment, as seen in FIG. 7, each of the sprocket support portions 16 includes spacers SC1, SC2, SC3, and SC4. As seen in FIG. 6, the spacer SC1 is provided between the sprockets SP1 and SP2 in the axial direction D2. The spacer SC2 is provided between the sprockets SP2 and SP3 in the axial direction D2. The spacer SC3 is provided between the sprockets SP3 and SP4 in the axial direction D2. The spacer SC4 is provided between the sprockets SP4 and SP5 in the axial direction D2. The spacer SC1 is provided on the axially extending surface 20A. The spacer SC2 is provided on the axially extending surface 20B. The spacer SC3 is provided on the axially extending surface 20C. The spacer SC4 is provided on the axially extending surface 20D.

As seen in FIGS. 6 and 7, the sprocket support member 12 includes a coupling part 22. The coupling part 22 couples radially inner ends 16A of the plurality of sprocket support portions 16. The sprocket support portions 16 extend radially outwardly from the coupling part 22. The radially inner ends 16A of the plurality of sprocket support portions 16 are circumferentially coupled together. In this embodiment, the coupling part 22 has a tubular shape and is provided radially outwardly of the central cylindrical portion 14. The central cylindrical portion 14 is partly embedded in an inner periphery of the coupling part 22.

Figure 8:
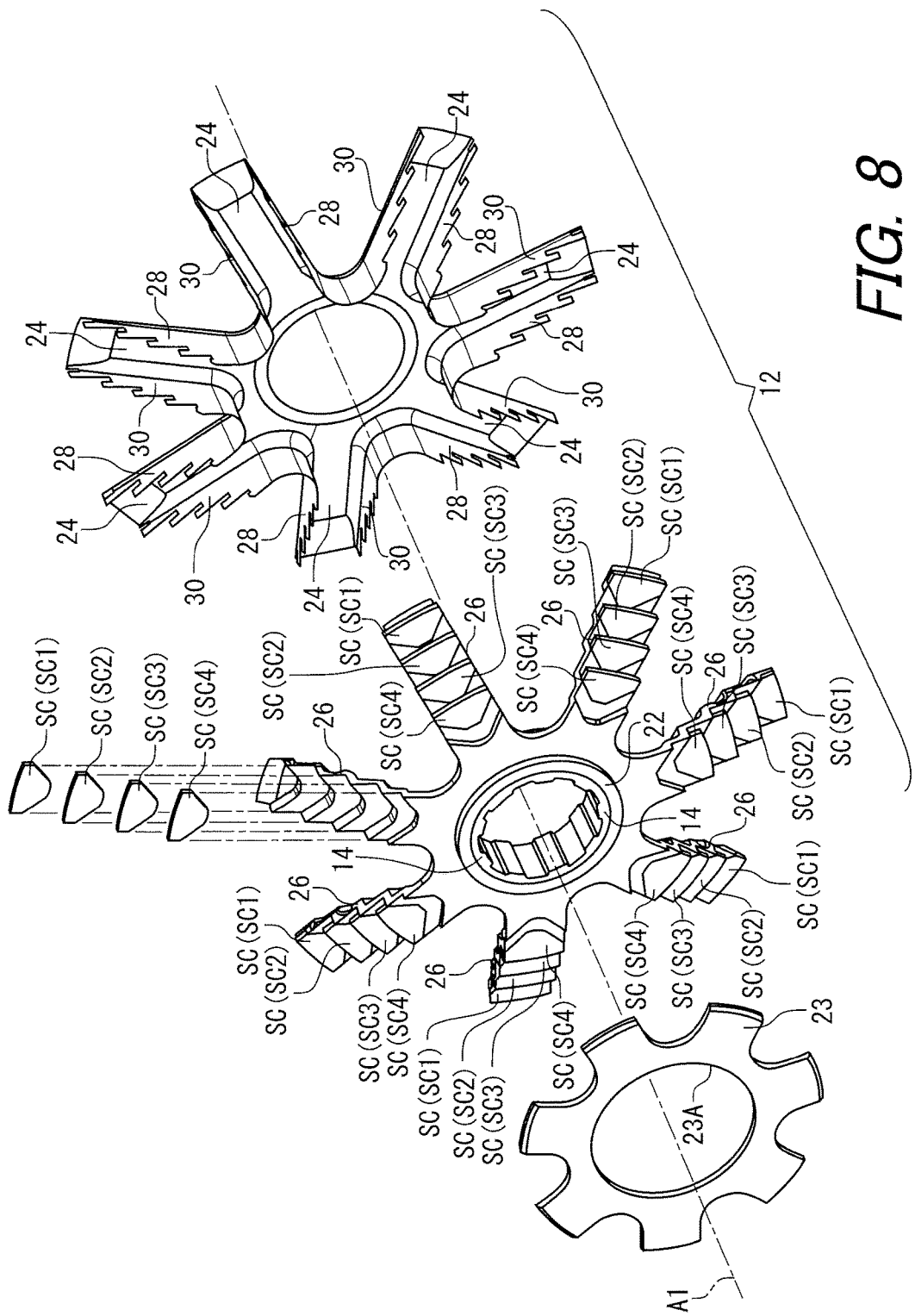
FIG. 8 is an exploded perspective view of the sprocket support member of the bicycle sprocket assembly illustrated in FIG. 1.

As seen in FIGS. 6 and 8, the sprocket support member 12 includes a support part 23. The support part 23 is attached to the coupling part 22 and the radially inner ends 16A of the plurality of sprocket support portions 16. The support part 23 is provided radially outwardly of the coupling part 22. The support part 23 includes an opening 23A. The coupling part 22 is provided in the opening 23A.

As seen in FIG. 6, the sprocket support member 12 includes an adhesive AD. The sprockets SP1 to SP5 are attached to the sprocket support portions 16 with the adhesive AD. In this embodiment, the sprockets SP1 to SP5 and the spacers SC1 to SC4 are attached to the sprocket support portions 16 with the adhesive AD. However, the sprockets SP1 to SP5 can be attached to the sprocket support portions 16 with fasteners such as pins.

Each sprocket support portion of the plurality of sprocket support portions 16 comprises the at least one radially extending surface 18, the at least one axially extending surface 20, and the interior cavity 21. The sprocket support portion 16 comprises the radially extending surface 18A to 18E, the axially extending surface 20A to 20E, and the interior cavity 21.

Figure 9:
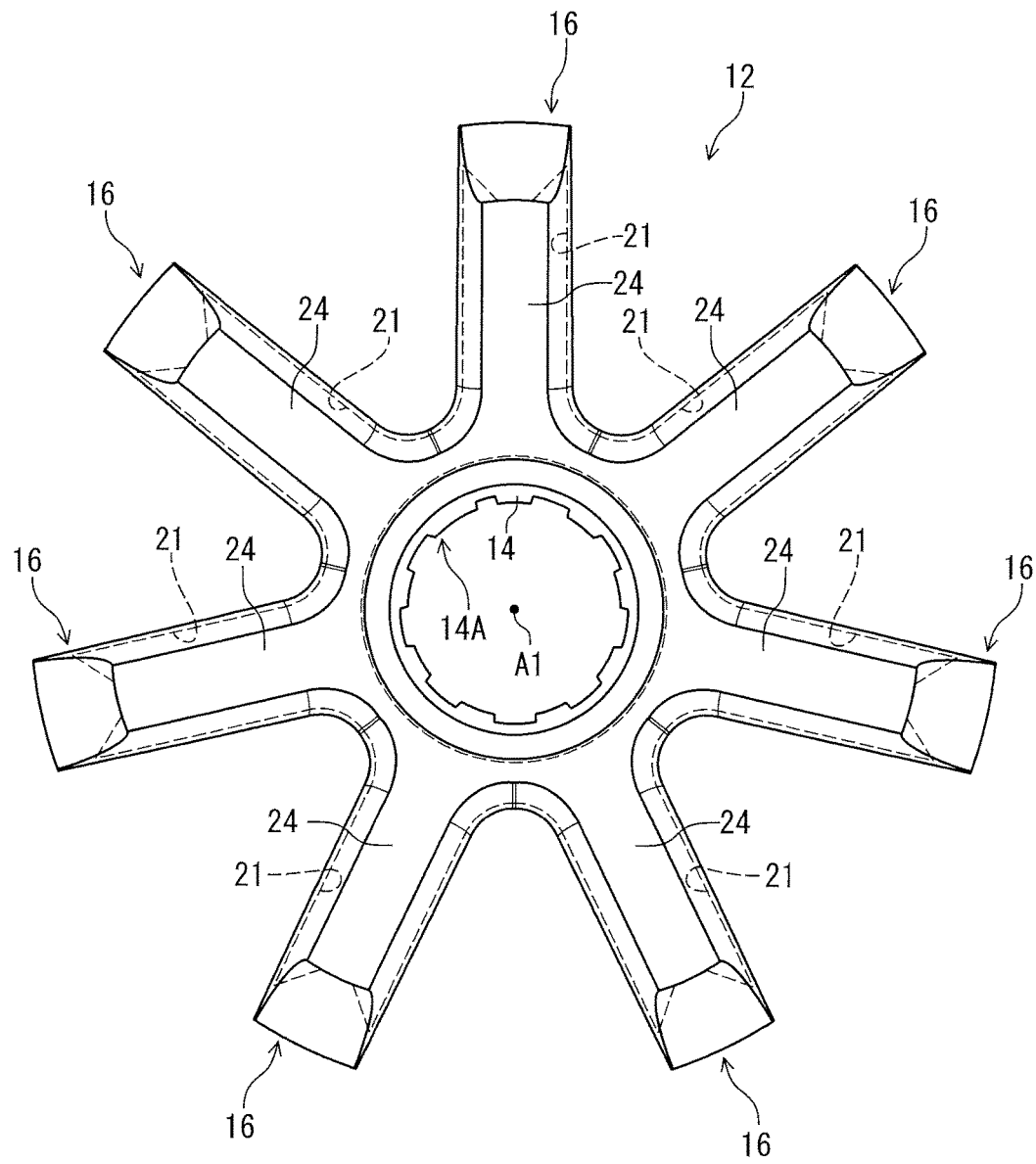
FIG. 9 is a side elevational view of the sprocket support member of the bicycle sprocket assembly illustrated in FIG. 1.

As seen in FIG. 9, the interior cavities 21 of the sprocket support portions 16 are circumferentially connected to each other in a radially outer area of the coupling part 22. However, the interior cavities 21 can at least partly be a separate cavity from each other.

As seen in FIG. 6, the interior cavity 21 is provided on a reverse side of the at least one radially extending surface 18 and the at least one axially extending surface 20 in the axial direction D2. The interior cavity 21 is provided on a reverse side of the radially extending surfaces 18A to 18E and the axially extending surfaces 20A to 20E of the sprocket support portion 16 in the axial direction D2.

As seen in FIG. 9, the at least one sprocket support portion of the plurality of sprocket support portions 16 comprises a cover portion 24 to form the interior cavity 21. In this embodiment, as seen in FIG. 8, the at least one sprocket support portion of the plurality of sprocket support portions 16 includes a sprocket attachment part 26, a first side wall 28, a second side wall 30, and the cover portion 24. Each of the plurality of sprocket support portion 16 includes the sprocket attachment part 26, the first side wall 28, the second side wall 30, and the cover portion 24.

As seen in FIG. 6, the sprocket attachment part 26 includes the at least one radially extending surface 18 and the at least one axially extending surface 20. In this embodiment, each of the sprocket attachment parts 26 includes the radially extending surfaces 18A to 18E and the axially extending surfaces 20A to 20E. The cover portion 24 is spaced apart from the sprocket attachment part 26 in the axial direction D2.

Figure 10:
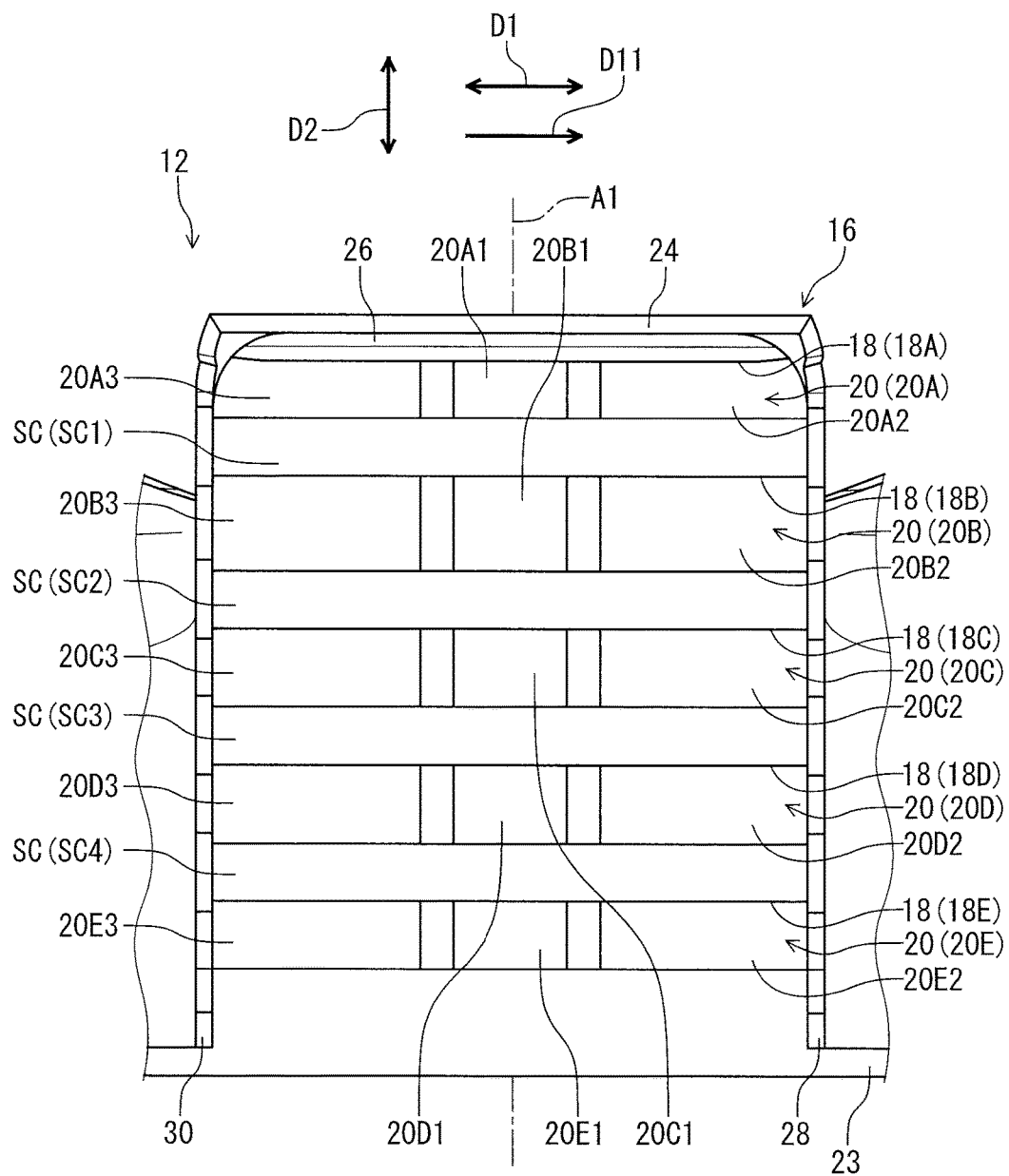
FIG. 10 is a partial plan view of the sprocket support member of the bicycle sprocket assembly illustrated in FIG. 1.

As seen in FIG. 10, The first side wall 28 extends between the sprocket attachment part 26 and the cover portion 24 in the axial direction D2. The second side wall 30 extends between the sprocket attachment part 26 and the cover portion 24 in the axial direction D2. The first side wall 28 extends from the cover portion 24 toward the at least one radially extending surface 18 and the at least one axially extending surface 20 in the axial direction D2. The second side wall 30 extends from the cover portion 24 toward the at least one radially extending surface 18 and the at least one axially extending surface 20 in the axial direction D2.

In this embodiment, the first side wall 28 extends from the cover portion 24 toward the radially extending surfaces 18A to 18E and the axially extending surfaces 20A to 20E in the axial direction D2. The second side wall 30 extends from the cover portion 24 toward the radially extending surfaces 18A to 18E and the axially extending surfaces 20A to 20E in the axial direction D2.

Figure 11:
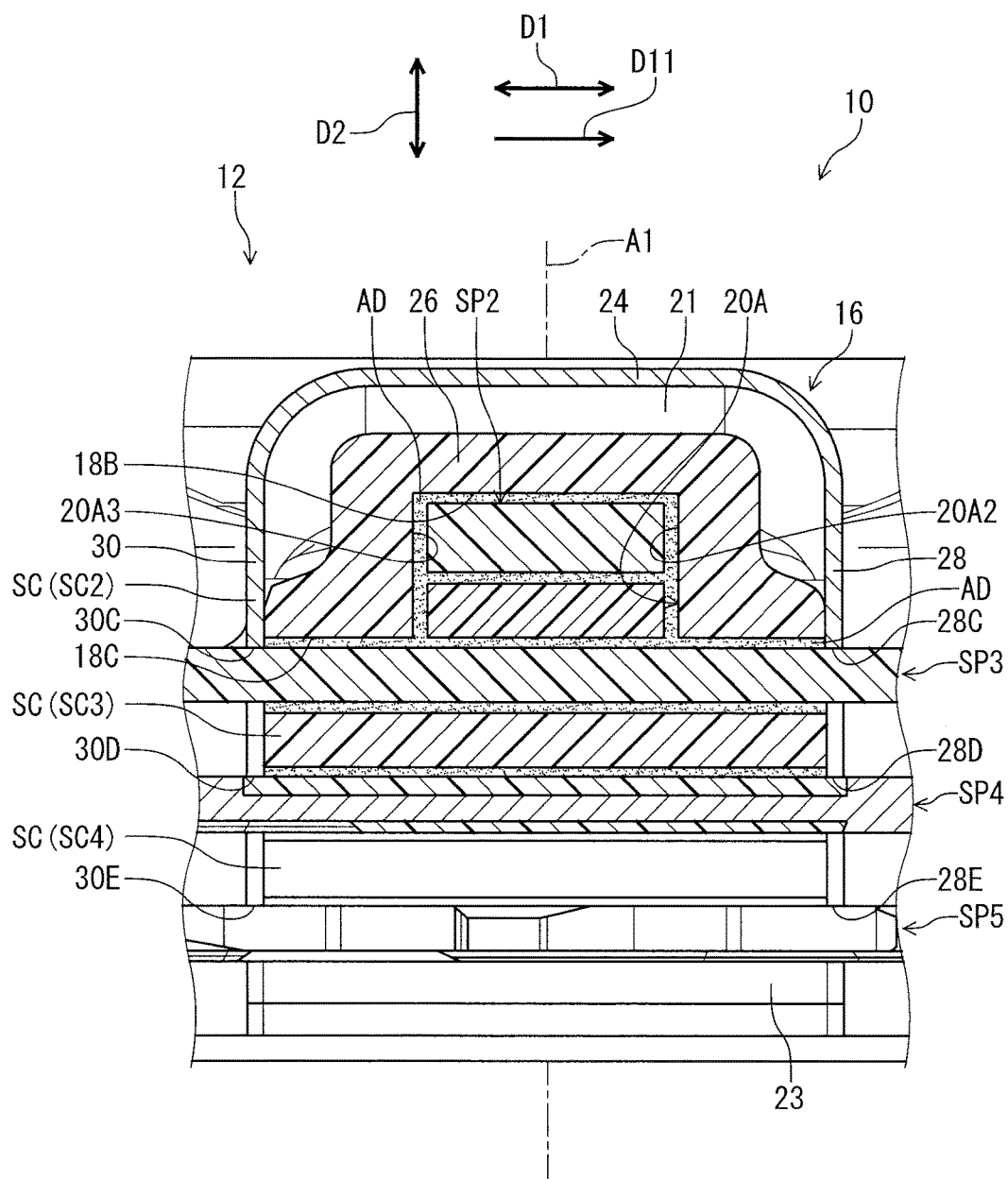
FIG. 11 is a cross-sectional view of the bicycle sprocket assembly taken along line XI-XI of FIG. 6.

As seen in FIG. 11, the sprocket attachment part 26, the first side wall 28, the second side wall 30, and the cover portion 24 provide the interior cavity 21. The first side wall 28 and the second side wall 30 are attached to the sprocket attachment part 26. The cover portion 24 faces the sprocket attachment part 26 in the axial direction D2. The first side wall 28 and the second side wall 30 are spaced apart from each other in the circumferential direction D1.

In this embodiment, as seen in FIGS. 8 and 11, the cover portion 24 is integrally provided with the first side wall 28 and the second side wall 30 as a one-piece unitary member. The sprocket attachment part 26 is a separate member from the cover portion 24, the first side wall 28, and the second side wall 30. However, at least one of the first side wall 28 and the second side wall 30 can be a separate member from the cover portion 24. At least one of the first side wall 28 and the second side wall 30 can be integrally provided with the sprocket attachment part 26. The cover portion 24 can include a hole that is offset from the rotational center axis A1.

The plurality of sprocket support portions 16 is made of a material different from a material of the at least one sprocket SP. In this embodiment, the sprocket support portion 16 is made of the material different from the material of each of the sprockets SP1 to SP5. The sprocket attachment part 26 is made of a first material. The cover portion 24 is made of a second material different from the first material. The first material includes a non-metallic material. The non-metallic material includes a fiber-reinforced plastic. The second material includes a metallic material. The metallic material includes at least one of aluminum, iron, and titanium. The spacers SC are made of a non-metallic material such as a resin material. However, the materials of the above elements are not limited to this embodiment.

Figure 12:
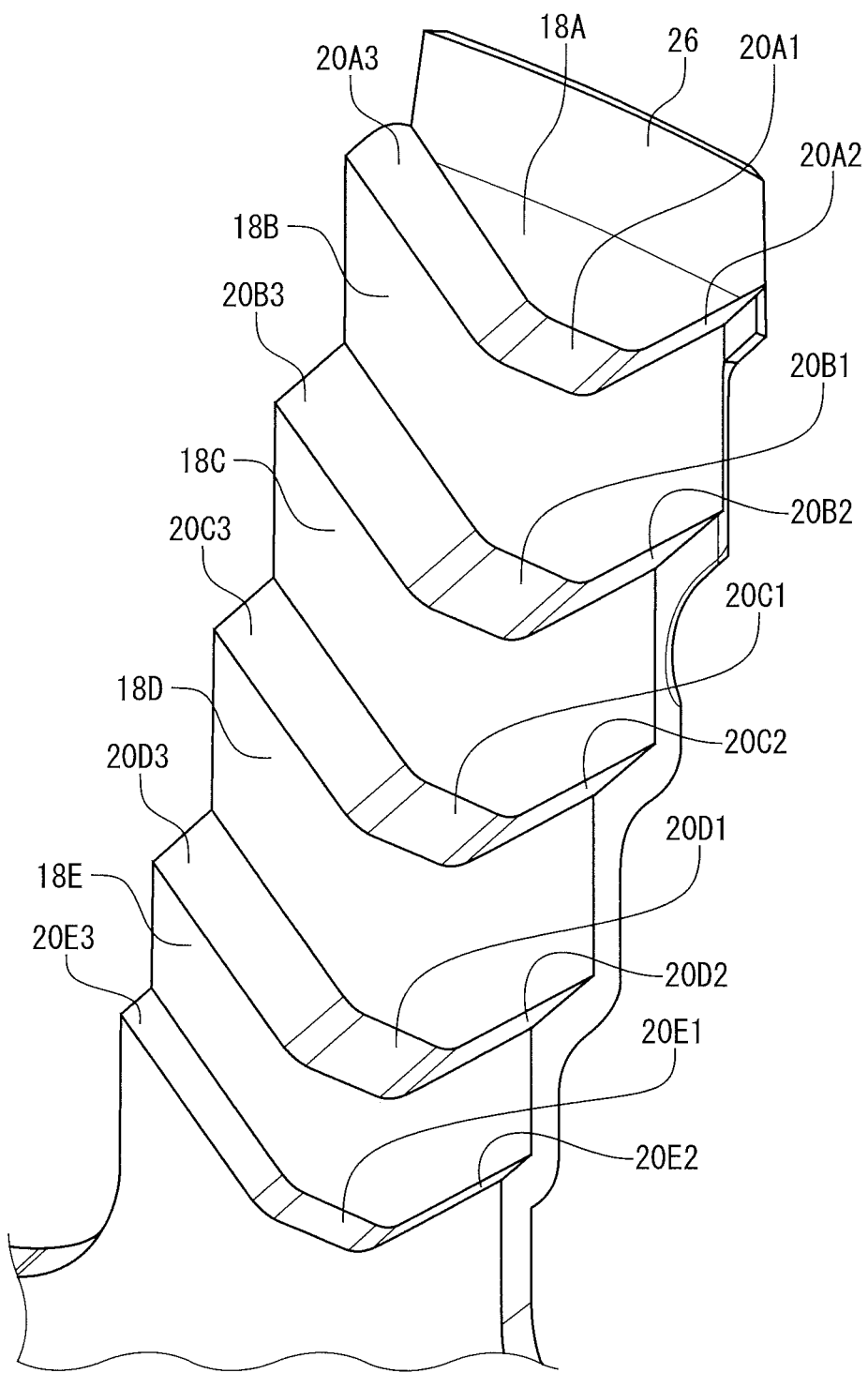
FIG. 12 is a partial perspective view of a sprocket attachment part of the sprocket support member illustrated in FIG. 7.

As seen in FIG. 12, the axially extending surface 20A includes a first surface 20A1, a second surface 20A2, and a third surface 20A3. The first surface 20A1 radially outwardly faces. The second surface 20A2 is inclined relative to the first surface 20A1. The third surface 20A3 is inclined relative to the first surface 20A1.

The axially extending surface 20B includes a first surface 20B1, a second surface 20B2, and a third surface 20B3. The first surface 20B1 radially outwardly faces. The second surface 20B2 is inclined relative to the first surface 20B1. The third surface 20B3 is inclined relative to the first surface 20B1.

The axially extending surface 20C includes a first surface 20C1, a second surface 20C2, and a third surface 20C3. The first surface 20C1 radially outwardly faces. The second surface 20C2 is inclined relative to the first surface 20C1. The third surface 20C3 is inclined relative to the first surface 20C1.

The axially extending surface 20D includes a first surface 20D1, a second surface 20D2, and a third surface 20D3. The first surface 20D1 radially outwardly faces. The second surface 20D2 is inclined relative to the first surface 20D1. The third surface 20D3 is inclined relative to the first surface 20D1.

The axially extending surface 20E includes a first surface 20E1, a second surface 20E2, and a third surface 20E3. The first surface 20E1 radially outwardly faces. The second surface 20E2 is inclined relative to the first surface 20E1. The third surface 20E3 is inclined relative to the first surface 20E1.

Figure 13:
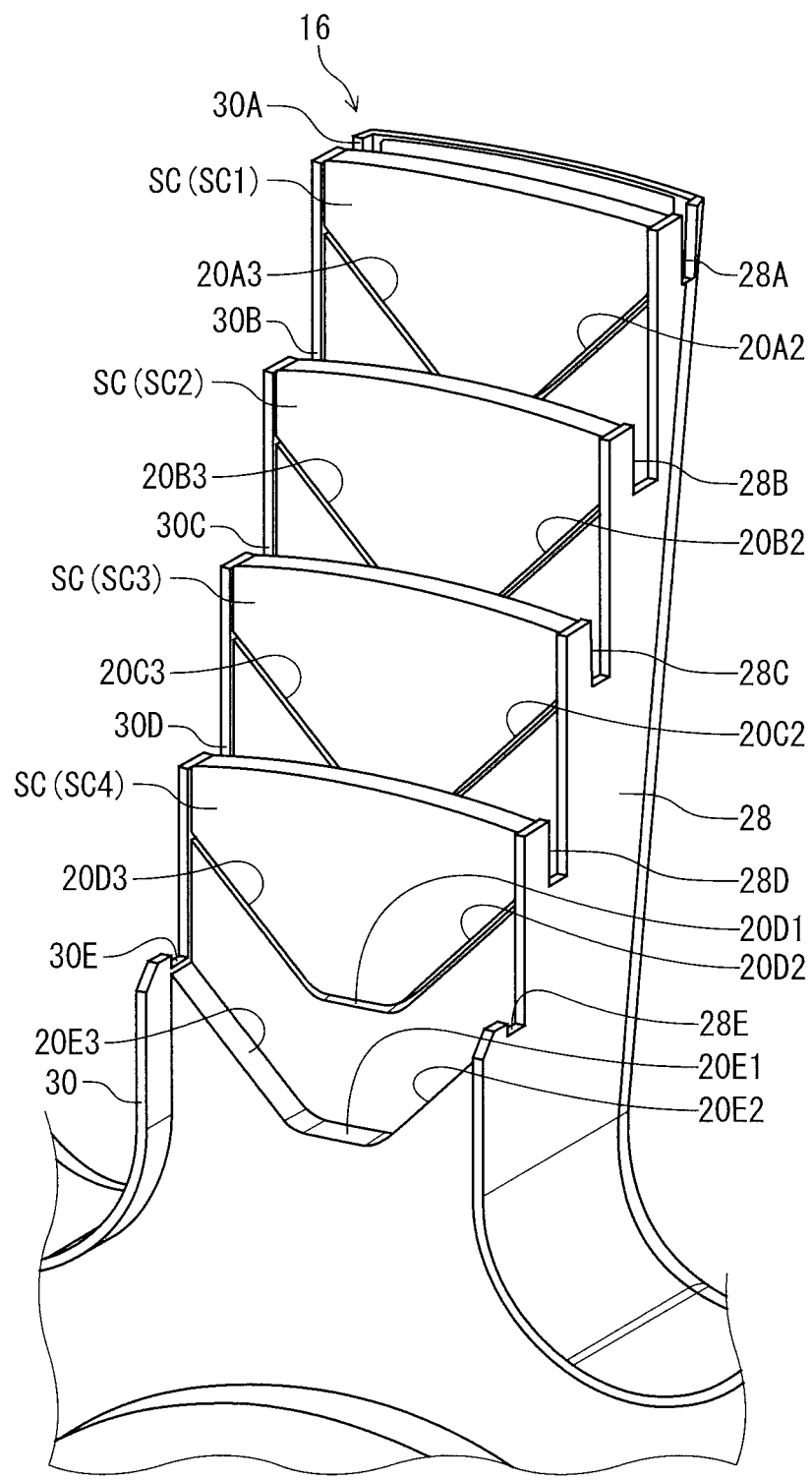
FIG. 13 is a partial perspective view of the sprocket support member illustrated in FIG. 7.

As seen in FIG. 13, the spacer SC1 and the projection SP13 (FIG. 4) are provided between the second surface 20A2 and the third surface 20A3 in the circumferential direction D1. The spacer SC2 and the projection SP23 (FIG. 4) are provided between the second surface 20B2 and the third surface 20B3 in the circumferential direction D1. The spacer SC3 and the projection SP33 (FIG. 4) is provided between the second surface 20C2 and the third surface 20C3 in the circumferential direction D1. The spacer SC4 and the projection SP43 (FIG. 4) are provided between the second surface 20D2 and the third surface 20D3 in the circumferential direction D1. The projection SP53 (FIG. 4) is provided between the second surface 20E2 and the third surface 20E3 in the circumferential direction D1.

Figure 14:
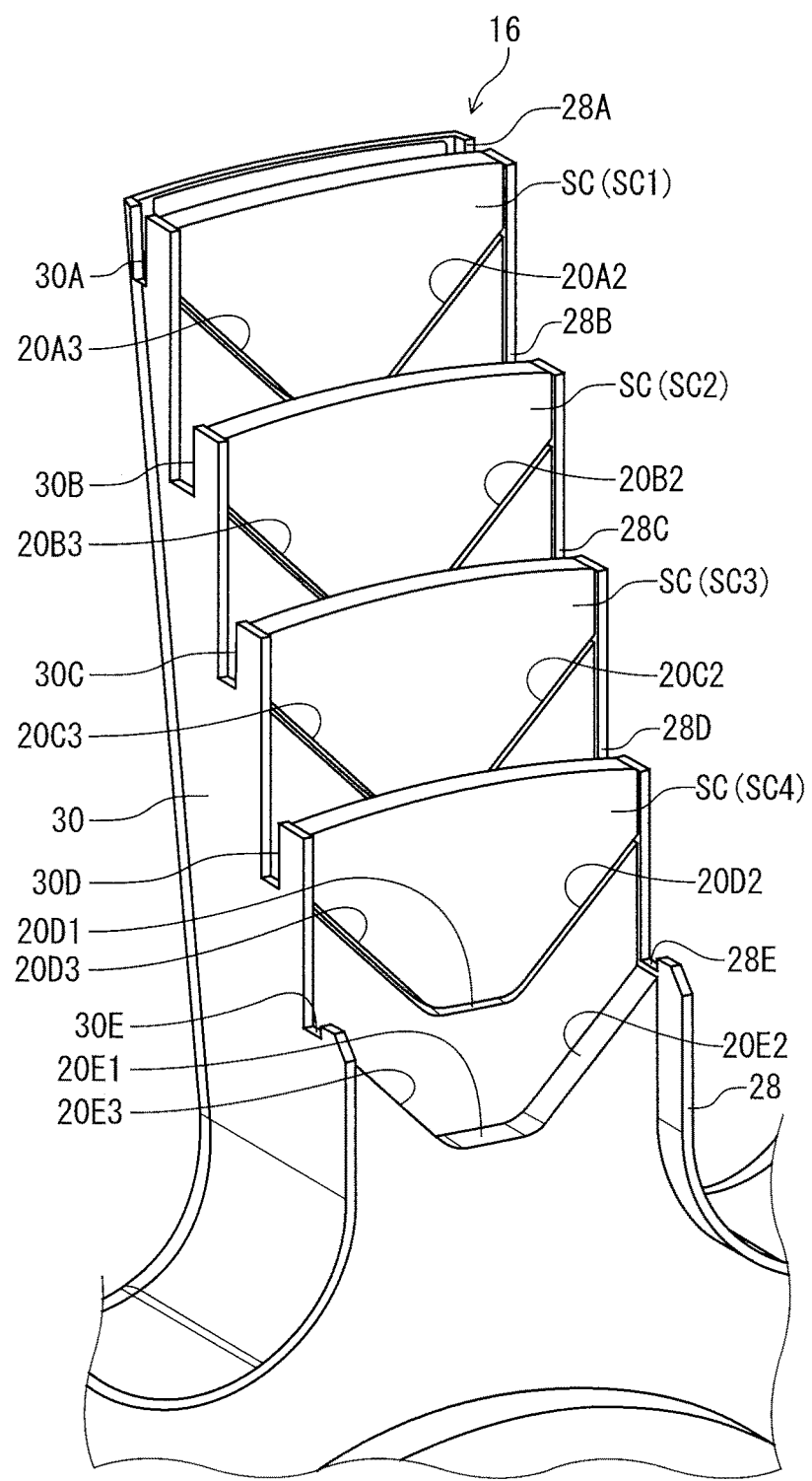
FIG. 14 is another partial perspective view of the sprocket support member illustrated in FIG. 7.
Figure 15:
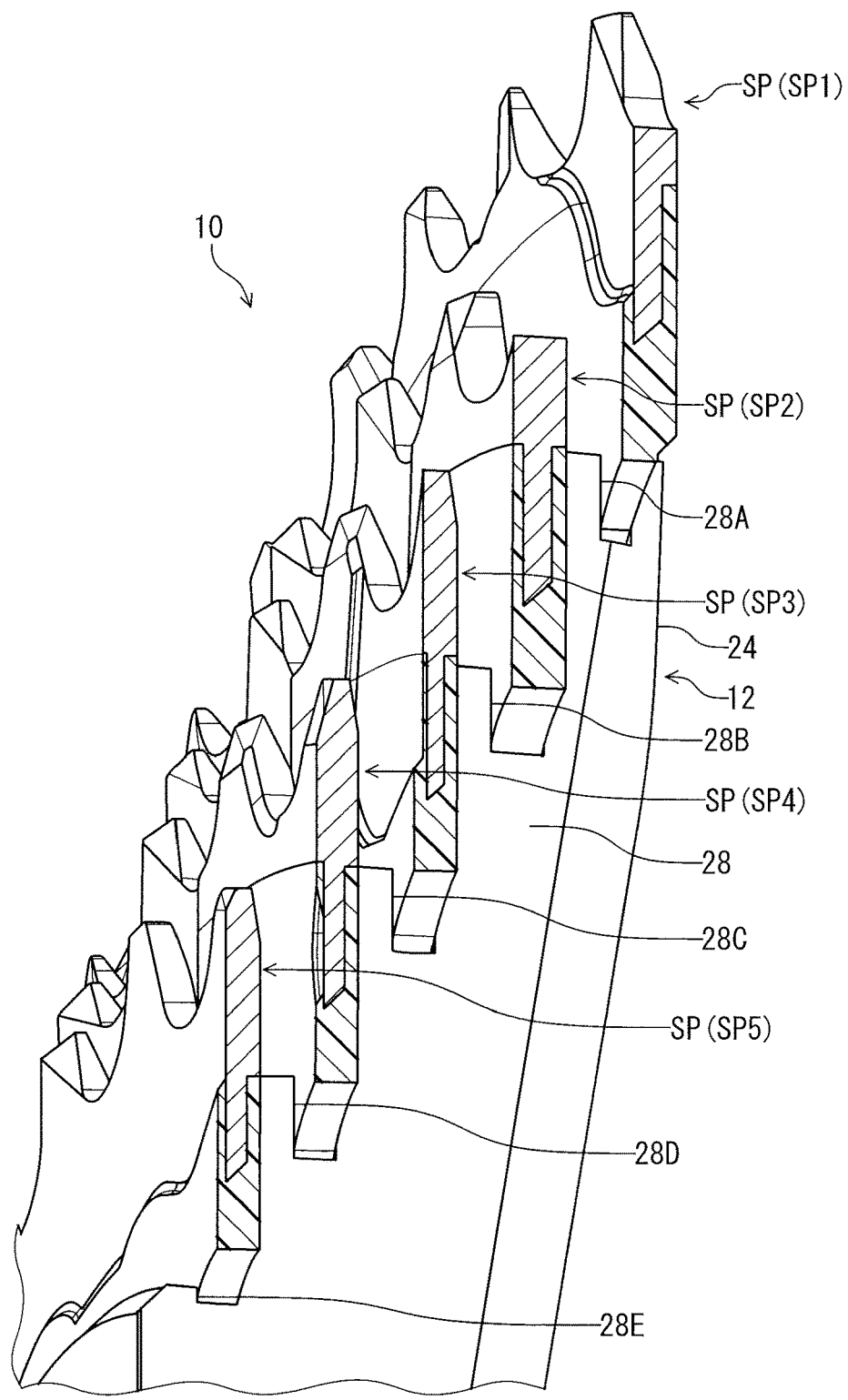
FIG. 15 is a partial perspective view of the sprocket support member illustrated in FIG. 7.
Figure 16:
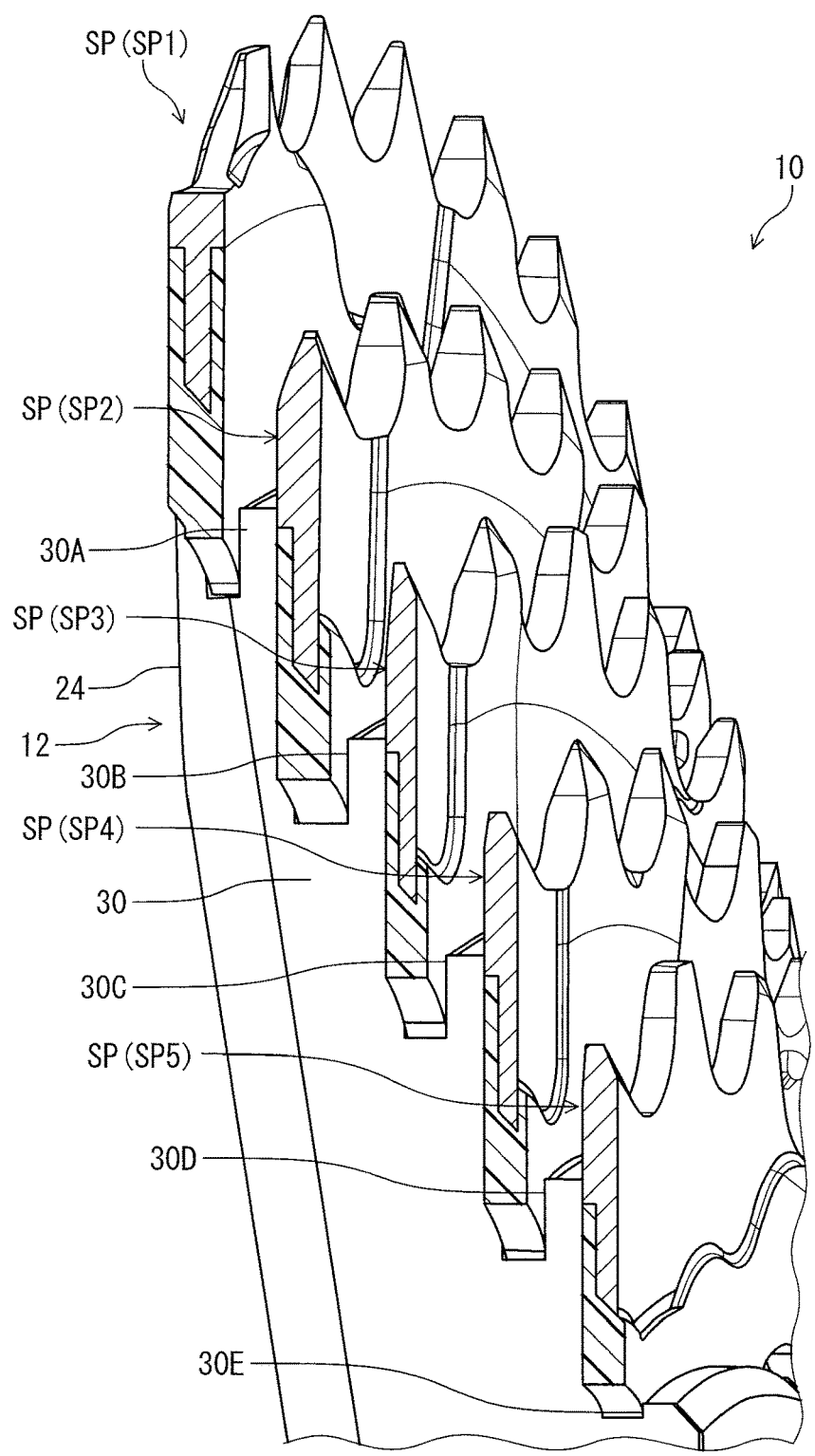
FIG. 16 is another partial perspective view of the sprocket support member illustrated in FIG. 7.

As seen in FIG. 13, the first side wall 28 includes first slits 28A, 28B, 28C, 28D, and 28E. As seen in FIG. 14, the second side wall 30 includes second slits 30A, 30B, 30C, 30D, and 30E. As seen in FIGS. 15 and 16, the sprocket SP1 is provided in the first slit 28A and the second slit 30A. The sprocket SP2 is provided in the first slit 28B and the second slit 30B. The sprocket SP3 is provided in the first slit 28C and the second slit 30C. The sprocket SP4 is provided in the first slit 28D and the second slit 30D. The sprocket SP5 is provided in the first slit 28E and the second slit 30E.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
a sprocket support member configured to support at least one sprocket that is a separate member from the sprocket support member, the sprocket support member comprising:
a central cylindrical portion comprising a hub engagement profile to engage with a bicycle hub assembly; and
a plurality of sprocket support portions extending radially outwardly from the central cylindrical portion with respect to a rotational center axis of the bicycle sprocket assembly, at least two sprocket support portions of the plurality of sprocket support portions being spaced apart from each other in a circumferential direction about the rotational center axis, at least one sprocket support portion of the plurality of sprocket support portions comprising:
at least one radially extending surface extending radially relative to the rotational center axis to support at least one of the at least one sprocket;
at least one axially extending surface extending in an axial direction parallel to the rotational center axis;
an interior cavity; and
a cover portion to form the interior cavity, the interior cavity being provided between the cover portion and the at least one axially extending surface.

2. The bicycle sprocket assembly according to claim 1, wherein
the at least one sprocket support portion of the plurality of sprocket support portions includes a sprocket attachment part,
the sprocket attachment part includes the at least one radially extending surface and the at least one axially extending surface, and
the interior cavity is provided on a reverse side of the at least one radially extending surface and the at least one axially extending surface with respect to the sprocket attachment part in the axial direction.

3. The bicycle sprocket assembly according to claim 1, wherein
the at least one sprocket support portion of the plurality of sprocket support portions includes a sprocket attachment part,
the sprocket attachment part includes the at least one radially extending surface and the at least one axially extending surface, and
each sprocket support portion of the plurality of sprocket support portions comprises
the at least one radially extending surface,
the at least one axially extending surface, and
the interior cavity provided on a reverse side of the at least one radially extending surface and the at least one axially extending surface with respect to the sprocket attachment part in the axial direction.

4. The bicycle sprocket assembly according to claim 1, wherein
the central cylindrical portion is a separate member from the plurality of sprocket support portions.

5. The bicycle sprocket assembly according to claim 1, wherein
the at least one radially extending surface includes a plurality of radially extending surfaces extending radially relative to the rotational center axis, and
the at least one axially extending surface includes a plurality of axially extending surfaces extending in the axial direction.

6. The bicycle sprocket assembly according to claim 5, wherein
the plurality of radially extending surfaces and the plurality of axially extending surfaces provide a stepped shape.

7. The bicycle sprocket assembly according to claim 1, further comprising
the at least one sprocket attached to the plurality of sprocket support portions.

8. The bicycle sprocket assembly according to claim 7, wherein
a sprocket of the at least one sprocket is attached to a radially extending surface of the at least one radially extending surface and an axially extending surface of the at least one axially extending surface.

9. The bicycle sprocket assembly according to claim 7, wherein
the at least one sprocket includes a plurality of sprockets attached to the plurality of sprocket support portions.

10. The bicycle sprocket assembly according to claim 9, wherein
the at least one radially extending surface includes a plurality of radially extending surfaces extending radially relative to the rotational center axis,
the at least one axially extending surface includes a plurality of axially extending surfaces extending in the axial direction, and
the plurality of sprockets is attached to the plurality of radially extending surfaces and the plurality of axially extending surfaces.

11. The bicycle sprocket assembly according to claim 1, wherein
the plurality of sprocket support portions is made of a material different from a material of the at least one sprocket.

12. The bicycle sprocket assembly according to claim 1, wherein
the at least one radially extending surface extends radially outwardly from the at least one axially extending surface.

13. The bicycle sprocket assembly according to claim 1, wherein
the at least one sprocket support portion of the plurality of sprocket support portions includes a sprocket attachment part, a first side wall, and a second side wall,
the sprocket attachment part includes the at least one radially extending surface and the at least one axially extending surface,
the cover portion is spaced apart from the sprocket attachment part in the axial direction,
the first side wall extends between the sprocket attachment part and the cover portion in the axial direction,
the second side wall extends between the sprocket attachment part and the cover portion in the axial direction, and
the sprocket attachment part, the first side wall, the second side wall, and the cover portion provide the interior cavity.

14. The bicycle sprocket assembly according to claim 13, wherein
the first side wall extends from the cover portion toward the at least one radially extending surface and the at least one axially extending surface in the axial direction, and the second side wall extends from the cover portion toward the at least one radially extending surface and the at least one axially extending surface in the axial direction.

15. The bicycle sprocket assembly according to claim 13, wherein
the sprocket attachment part is made of a first material, and
the cover portion is made of a second material different from the first material.

16. The bicycle sprocket assembly according to claim 15, wherein
the first material includes a non-metallic material, and
the second material includes a metallic material.

17. The bicycle sprocket assembly according to claim 16, wherein
the non-metallic material includes a fiber-reinforced plastic.

18. The bicycle sprocket assembly according to claim 16, wherein
the metallic material includes at least one of aluminum, iron, and titanium.

19. The bicycle sprocket assembly according to claim 1, wherein
the interior cavity is provided between the cover portion and the at least one radially extending surface in the axial direction.

20. The bicycle sprocket assembly according to claim 1, wherein
the at least one axially extending surface respectively extends from the at least one radially extending surfaces in the axial direction toward an opposite side with respect to the interior cavity.

21. The bicycle sprocket assembly according to claim 1, wherein
the at least one sprocket support portion of the plurality of sprocket support portions comprises a sprocket attachment part,
the sprocket attachment part includes the at least one radially extending surface and the at least one axially extending surface, and
the interior cavity is provided between the cover portion and the sprocket attachment part in the axial direction.

22. A bicycle sprocket assembly comprising:
a plurality of sprockets, one sprocket of the plurality of sprockets being a separate member from another sprocket of the plurality of sprockets;
a sprocket support member configured to support at least one sprocket of the plurality of sprockets, the sprocket support member being a separate member from the plurality of sprockets, the sprocket support member comprising:
a central cylindrical portion comprising a hub engagement profile to engage with a bicycle hub assembly; and
a plurality of sprocket support portions extending radially outwardly from the central cylindrical portion with respect to a rotational center axis of the bicycle sprocket assembly, at least two sprocket support portions of the plurality of sprocket support portions being spaced apart from each other in a circumferential direction about the rotational center axis, at least one sprocket support portion of the plurality of sprocket support portions comprising:
at least one axially extending surface extending in an axial direction parallel to the rotational center axis;
an interior cavity; and
a cover portion to form the interior cavity, the interior cavity being provided between the cover portion and the at least one axially extending surface.

23. The bicycle sprocket assembly according to claim 22, wherein
the at least one sprocket support portion of the plurality of sprocket support portions comprises at least one radially extending surface extending radially relative to the rotational center axis to support at least one of the at least one sprocket, and
the interior cavity is provided between the cover portion and the at least one radially extending surface in the axial direction.

24. The bicycle sprocket assembly according to claim 22, wherein
the at least one axially extending surface respectively extends from the at least one radially extending surfaces in the axial direction toward an opposite side with respect to the interior cavity.

25. The bicycle sprocket assembly according to claim 22, wherein
the at least one sprocket support portion of the plurality of sprocket support portions comprises a sprocket attachment part,
the sprocket attachment part includes the at least one radially extending surface and the at least one axially extending surface, and
the interior cavity is provided between the cover portion and the sprocket attachment part in the axial direction.

26. A bicycle sprocket assembly comprising:
a sprocket support member configured to support at least one sprocket that is a separate member from the sprocket support member, the sprocket support member comprising:
a central cylindrical portion; and
a plurality of sprocket support portions extending radially outwardly from the central cylindrical portion with respect to a rotational center axis of the bicycle sprocket assembly, at least two sprocket support portions of the plurality of sprocket support portions being spaced apart from each other in a circumferential direction defined about the rotational center axis, at least one sprocket support portion of the plurality of sprocket support portions comprising:
a plurality of radially extending surfaces extending radially relative to the rotational center axis to support at least one of the at least one sprocket;
a plurality of axially extending surfaces extending in an axial direction parallel to the rotational center axis, the plurality of radially extending surfaces and the plurality of axially extending surfaces providing a stepped shape;
an interior cavity; and
a cover portion to form the interior cavity, the interior cavity being provided between the cover portion and at least one axially extending surface of the plurality of axially extending surfaces.

27. The bicycle sprocket assembly according to claim 26, wherein
the interior cavity is provided between the cover portion and at least one radially extending surface of the plurality of radially extending surfaces in the axial direction.

28. The bicycle sprocket assembly according to claim 26, wherein the plurality of axially extending surfaces respectively extends from the plurality of radially extending surfaces in the axial direction toward an opposite side with respect to the interior cavity.

29. The bicycle sprocket assembly according to claim 26, wherein the at least one sprocket support portion of the plurality of sprocket support portions comprises a sprocket attachment part, the sprocket attachment part includes the plurality of radially extending surfaces and the plurality of axially extending surfaces, and the interior cavity is provided between the cover portion and the sprocket attachment part in the axial direction.

* * * * *